Aug. 5, 1930.　　　B. F. W. HEYER　　　1,772,217
APPARATUS FOR TESTING BATTERIES
Filed July 25, 1925　　　4 Sheets-Sheet 1
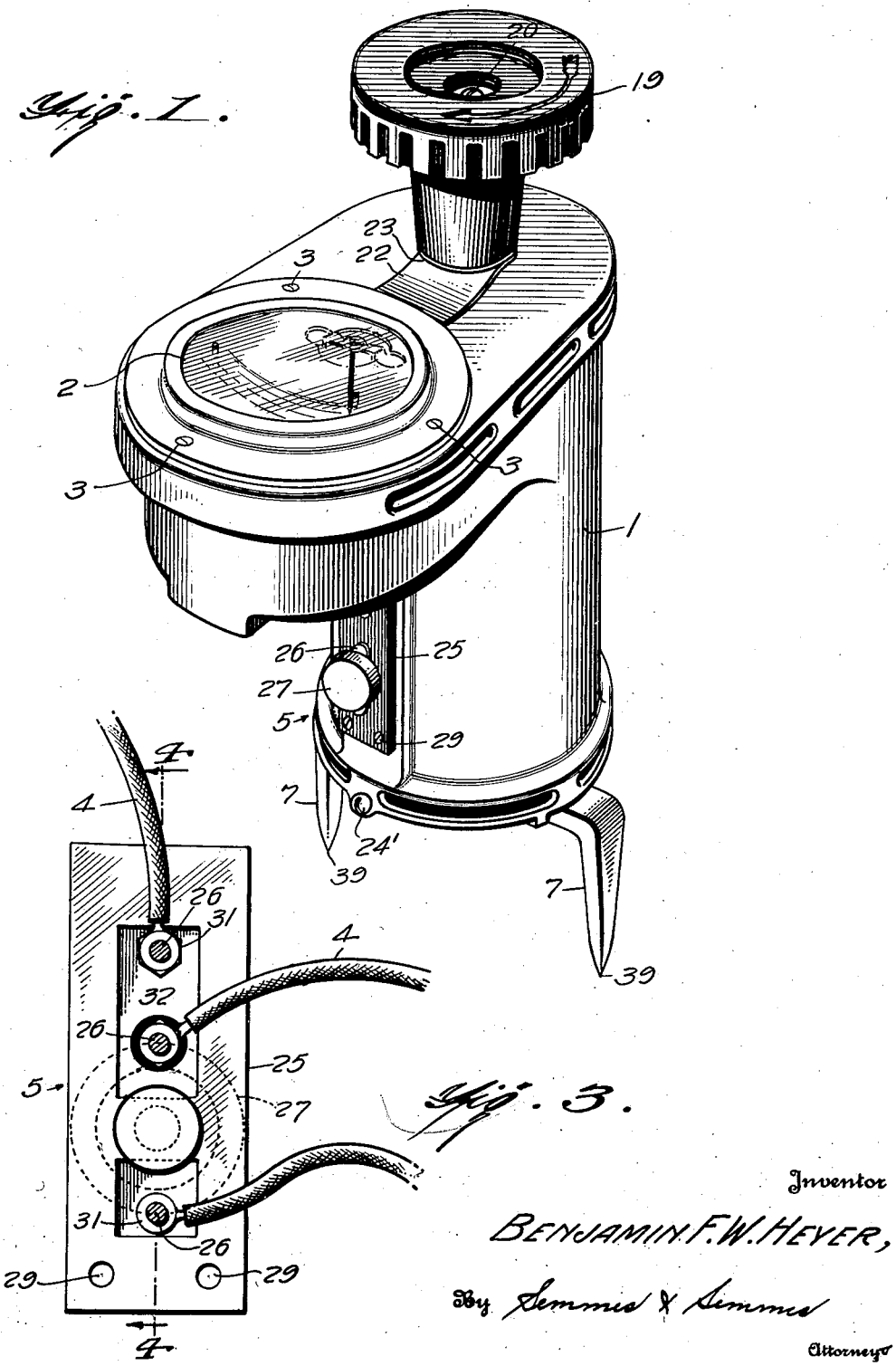
Inventor
BENJAMIN F. W. HEYER,
By Semmes & Semmes
Attorneys Aug. 5, 1930.                B. F. W. HEYER                1,772,217
                    APPARATUS FOR TESTING BATTERIES
                        Filed July 25, 1925        4 Sheets-Sheet 2
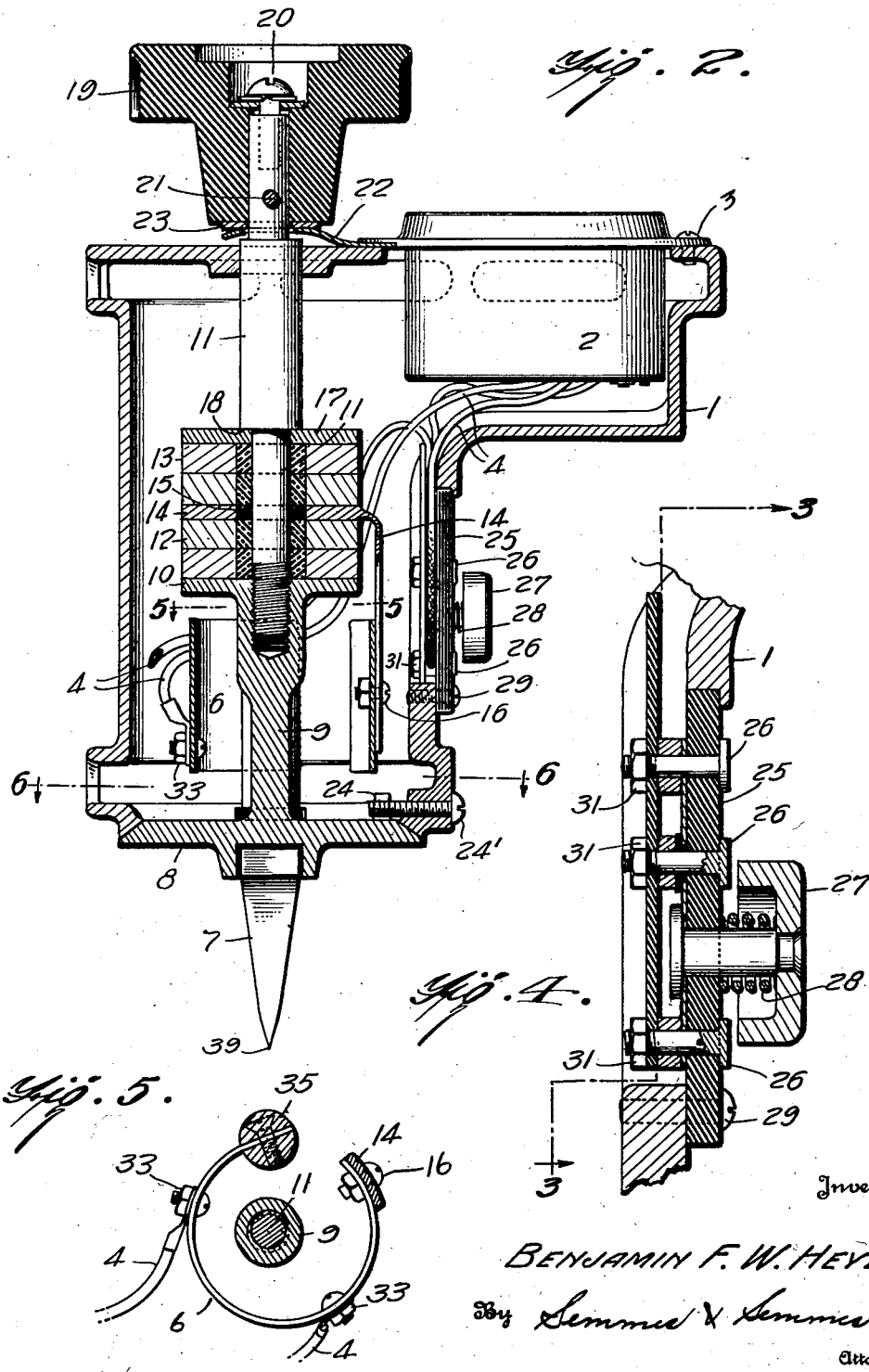

Aug. 5, 1930.  B. F. W. HÉYER  1,772,217
APPARATUS FOR TESTING BATTERIES
Filed July 25, 1925  4 Sheets-Sheet 3
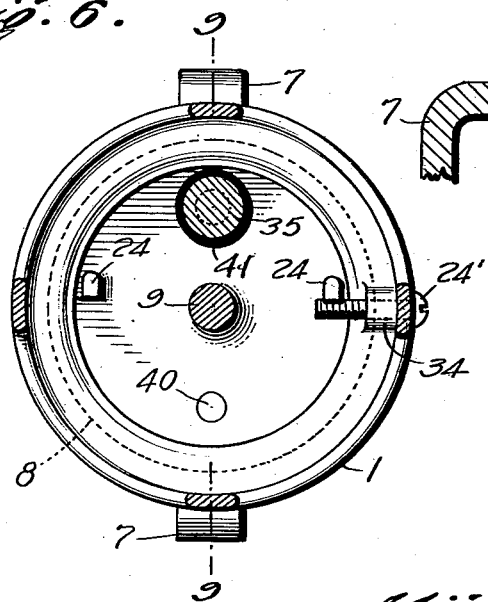
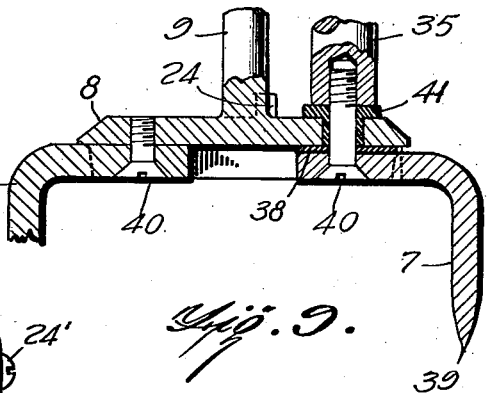
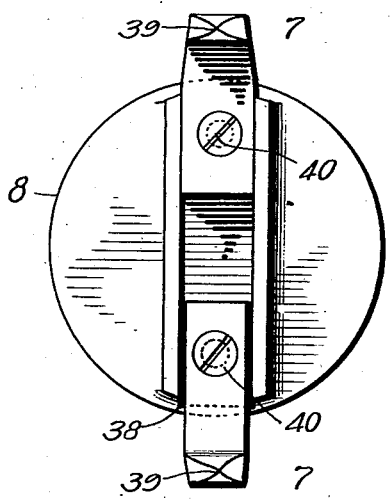
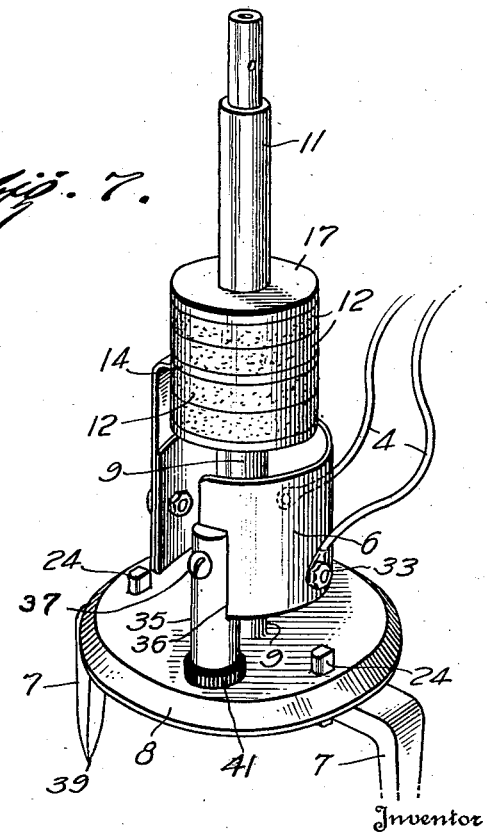
Inventor
BENJAMIN F. W. HEYER,
By Semmes & Semmes
Attorneys.

Aug. 5, 1930.  B. F. W. HEYER  1,772,217
APPARATUS FOR TESTING BATTERIES
Filed July 25, 1925  4 Sheets-Sheet 4

Inventor
BENJAMIN F. W. HEYER,
By Semmes & Semmes
Attorneys

Patented Aug. 5, 1930

1,772,217

UNITED STATES PATENT OFFICE

BENJAMIN F. W. HEYER, OF MONTCLAIR, NEW JERSEY

APPARATUS FOR TESTING BATTERIES

Application filed July 25, 1925. Serial No. 46,013.

My invention relates to meters and apparatus for testing high rate discharging batteries by the drop test method, and more particularly it relates to apparatus for testing starter batteries for motor vehicles.

In making tests on such batteries, the best results are obtained where the discharge rate is maintained at the same point as the battery encounters under actual service condition. It is known that at a given discharge rate the internal resistance of the battery causes a voltage drop of a predetermined amount. This voltage drop at such a discharge rate for any particular battery will vary, depending upon the condition of the charge of the battery, although the rate of variance for different batteries differs according to the capacity.

The ampere hour capacity of batteries varies roughly with the number of plates. Accordingly, tables have been compiled indicating for a battery of a given ampere hour capacity, that is for a battery having a given number of plates, the proper voltage drop at various stages of charge and at the discharge rate for which the battery is designed.

A careful tester should employ these tables, and during the test limit the discharging to the maximum rate for the particular battery under test and determine the voltage drop for the battery at several stages in the charging. The voltage drop may then be compared with the drops which have been previously ascertained by test.

An object of my invention is to provide a single meter for a battery testing device adapted to show the condition of a battery when discharging at a predetermined rate.

Another object of my invention is to provide a scale for the meter used with a testing device adapted to show the condition of a battery when discharging at a predetermined rate.

Yet another object of my invention is to provide a battery testing device with connecting means to eliminate the necessity of using a center reading meter.

Still another object of my invention is to provide an adjustable means connected in the battery circuit adapted to vary the battery discharge rate.

A further object of my invention is to provide a suitable housing for the testing device in which all of the elements are mounted to form a compact and portable unit.

A still further object of my invention is to provide a battery testing device which is strong and sturdy in construction, consisting of but few parts and not liable to get out of order even after long and continued use.

The present invention aims to provide a complete self-contained apparatus which will facilitate the work and observations of the tester, and will present to him without reckoning on his part, readings showing not only the proper discharge rate for the battery under test, but the voltage drop to be expected for that battery at different stages of the charging. The apparatus and meter provided therefor, are so constructed and mounted as to be observable and readable by the owner of the car so that he may likewise have indicated in similar form the charging conditions prevailing at any time.

In the present invention, it is proposed to connect in circuit in the apparatus a meter, an adjustable resistance, and suitable connecting means by which the battery may be readily placed in circuit without delay. The meter is provided with a scale so calibrated that the discharge rate for batteries of different characteristics may be read off and the voltage drop for each battery obtained for various stages of charging. Accordingly, the invention is concerned generally not only with the apparatus by which the testing is carried on, but also with the meter from which readings are taken.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is an elevational view of the battery testing device;

Fig. 2 is a vertical sectional view of the testing device showing the arrangement of parts;

Fig. 3 is a bottom plan view of the switching device;

Fig. 4 is a sectional view along line 4—4 of Fig. 3;

Fig. 5 is a sectional view along line 5—5 of Fig. 2;

Fig. 6 is a sectional view along line 6—6 of Fig. 2;

Fig. 7 is an elevational view of the rotatable unit showing the mounting for the resistances;

Fig. 8 is a bottom plan view of the contact prongs;

Fig. 9 is a sectional view along line 9—9 of Fig. 6;

Figure 10:
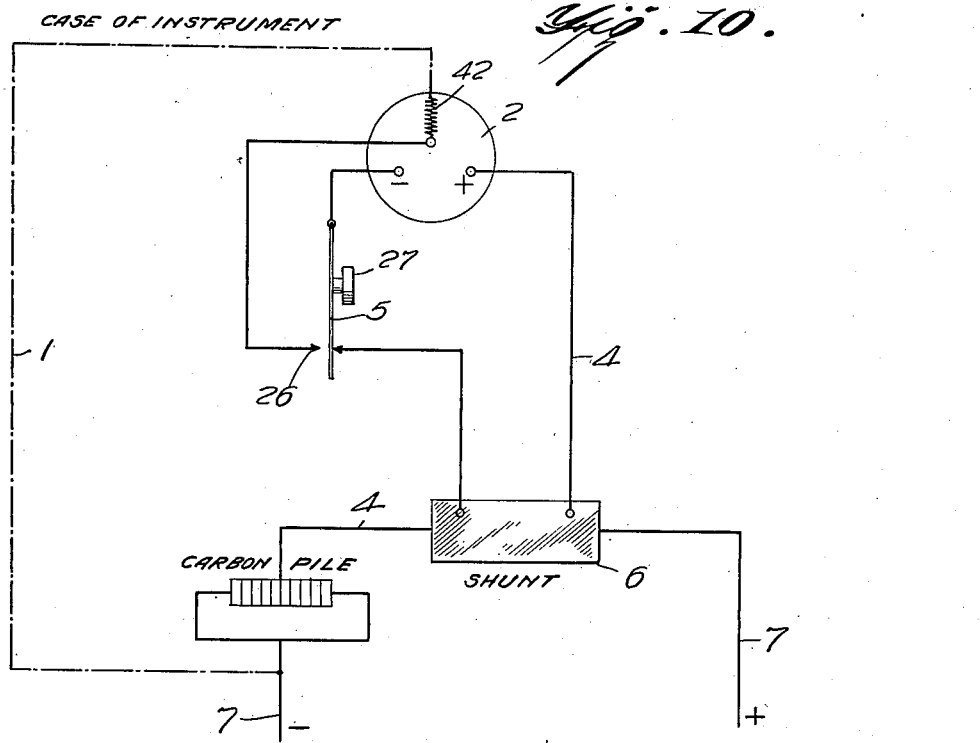
Fig. 10 is a diagrammatic view of the wiring circuit of the testing device.

Referring to the drawings, and more particularly to Figs. 1 and 2, I have shown my battery testing device comprising a housing or casing 1 having a meter 2 mounted therein. The meter is attached to the housing by suitable screw means 3, and is electrically connected in circuit by leads 4 to a switch means 5, a shunt resistance 6, and contact prongs 7.

The contact prongs are mounted upon a disk 8 which is free to rotate in the housing and at the same time maintains an electrical connection between the prongs and the housing. Attached to the disk 8 is an extension member 9 provided with a circular shoulder projection 10. The extension member 9 is threaded and adapted to receive a shaft 11 which is rotatably mounted in the casing 1.

Mounted upon the shaft 11 is an adjustable resistance 12 in the form of a carbon pile comprising a series of carbon disks 13. Connected with the disks is a contact member 14, insulated from the shaft 11 by a suitable insulating ring 15. The member 14 is attached to the resistance shunt 6 by a screw means 16.

The carbon disks are adapted to be compressed between the shoulder projection 10 and a circular plate 17 which engages with a shoulder 18 formed on the shaft 11. The shaft is rotated by means of a knob or handle 19 attached to the shaft by a screw means 20 and a pin 21.

It will be seen that when the shaft 11 is turned down and seated in the member 9, the disks 13 are under compression and the shaft, together with the extension member, disk 8 and prongs 7 rotate as a unit. When the shaft is unscrewed from the member 9, the carbon disks are released and are then separated by means of the contact member 14 which is under tension and is so mounted that it will tend to spring the carbon disks apart when the shaft is unscrewed. A spring member 22 is provided to maintain the disk 8 in electrical connection with the housing when the shaft 11 is unscrewed. The member 22 is adapted to fit under the casing of the meter and seats against a suitable washer 23 which engages with the handle.

The prongs are adapted to be rotated through 180°. Further rotation is arrested by means of suitable stops 24 formed upon the disk 8 which contact with a set screw 24' mounted in the casing. The meter 2 is essentially a combination ammeter and voltmeter, but is provided with a special type of scale designed and graduated to show the condition of the battery when discharging at a predetermined rate.

The switch 5 is of the double contact type and comprises a base 25 of suitable insulating material having contact members 26. A button 27, actuated by a spring means 28, tends to maintain the switch in its normal closed position. The switch is mounted upon the casing 1 by suitable screw means 29, and normally maintains a circuit between the meter 2, contact members 7 and the shunt 6. When the meter is connected in this manner, it functions as an ammeter.

When the button 27 is depressed against the action of the spring 28, which tends to keep the contacts open, a circuit is completed between the contact members 26 and the carbon pile 12, which is adjustable, as has been indicated, so as to regulate the discharge rate of a particular battery. The meter then functions as a voltmeter and shows the voltage drop due to the internal resistance of the battery. This drop bears a certain relation to the number of plates in the cell, and shows the condition of the cell generally which may be compared with tables which have been compiled by means of accurate tests.

Referring to Fig. 3, I have shown the connections to the switch 5. The leads 4 are connected with the contact members 26, and are held in position by a suitable fastening means 31 connected to a terminal strip 32. The button 27 is shown in the normal position and is held away from the contact members by means of the spring 28. The contacts 26 are suitably insulated and connected with the switch circuit so as to cause the meter to register when the button is depressed, or is in the normal position.

Referring to Fig. 4, I have shown the double contact switch 5 and the method of connecting it to the casing. The switch comprises the button 27 which is held in the normal position by means of the spring 28. Suitable contacts 26 are mounted upon the strip of insulating material 25, which is held in position by screw means 29 and an edge of the casing. The contacts 26 are connected to the leads 4 and form suitable circuits between the elements of the tester and the meter so that the meter will indicate the condition of the battery when the button is depressed, or when it is in normal position.

Referring to Fig. 5, I have shown the shunt 6 and the method of connecting the leads 4 to the shunt by suitable fastening means 33. The contact member 14, which aids in supporting the shunt, is attached by fastening means 16.

Referring to Fig. 6, I have shown the construction of the disk 8 which carries the contact members 7, which are in the form of prongs. The stops 24 which limit the movement of the disk are formed integral with it, and engage with the bolt 24' which is mounted upon the casing by means of a threaded recess 34.

Referring to Fig. 7, I have shown a method of mounting the carbon pile 12 and the shunt resistance 6 on the rotatable shaft. The shunt 6 is mounted upon the disk 8 by means of a vertical support 35 which is provided with a slot 36 and a set screw 37 adapted to engage with the shunt and hold it in position. The leads 4 connect with the shunt and are attached thereto by fastening means 33.

Referring to Fig. 8, I have shown the arrangement of the contact members or prongs upon the rotatable disk. One of the prongs is insulated from the disk 8 by a suitable insulating material 38. The contact points 39 of the prongs are shaped so as to insure a good electrical contact when the prongs are placed in connection with a battery cell.

Referring to Fig. 9, I have shown a method of mounting the contact prongs upon the disk 8. The prongs 7 are adapted to fit in a slot or rest formed integral with the disk, and are fastened thereto by a suitable screw means 40. The upright support member 35 to which the shunt 6 is attached is insulated from the disk by suitable insulation 41.

Referring to Fig. 10, I have shown a diagrammatic view of the wiring diagram of the battery testing device. The prongs 7 which make contact with the battery are connected through suitable leads 4 and the instrument casing 1, to the meter 2, which is provided with a multiplying resistance 42.

Figure 11:
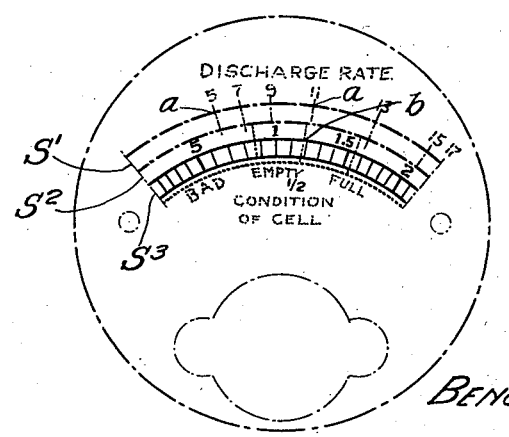
Fig. 11 is a diagrammatic view of the scale showing the graduations thereon.

Referring to Fig. 11, I have shown the scale which is used in connection with the meter 2. This scale is so graduated as to indicate the proper discharge rate, the voltage drop and the general condition of a particular battery under test.

The scale S' is so calibrated as to indicate by markings $a$ the discharge rate for a battery having a given ampere hour capacity, or for convenience in practice, a battery having a given number of plates. It is recognized that for practical purposes the ampere hour capacity of a battery may be considered as varying with the number of plates. The scale graduations $a$ show that a battery of say five plates should be made to discharge with the meter indicator in line with the first marking, which is five. Similarly, the discharging rates for batteries of other capacity having plates to the number of seventeen are provided on the scale.

The scale $S^2$ is calibrated so as to indicate by markings $b$ the voltage drop to be expected when the battery under test is empty, half charged, or fully charged, when the battery is discharging at its intended rate. For instance, when a battery is empty, the voltage drop indicated at the first marking $b$ has been determined by test to be approximately one and two-tenths volts. However, it is not necessary to consider this reading in volts provided the scale is properly calibrated; the observer merely depends upon the markings $b$ at different conditions of charge, as shown by the scale $S^3$.

The operation of my device is as follows: The contact prongs 7 are put on battery posts, one cell at a time, a current will flow through the circuit as described, and is varied by means of the handle 19 which operates the carbon pile 12. The meter 2 reads the drop across the shunt 6 as long as the button 27 is not pressed. By turning the handle 19, the current is regulated and set to the proper value on the meter scale, indicating the number of plates or the proper discharge rate for the particular battery being tested. After having adjusted the discharge rate to the point for the battery under test, as shown on the special scale marking, the push button 27 is pressed. This button connects the meter in series with the multiplying resistance 42 and the meter then functions as a voltmeter.

While the meter is changed to a voltmeter and reads voltage, the discharge rate which was previously adjusted to the proper point continues uninterrupted. Calculation of the meter scale is such that the observer will see from the face of the meter when the battery is fully charged, and at the same time the proper discharge rate is maintained through adjustment of the resistance pile, though batteries on test and having different capacities may be brought to a predetermined discharge rate and the charging continued until the voltage drop indicates that the battery is fully charged.

It will be understood that while the present apparatus and meter affords correct indication of charging conditions at all times, a careful check may be carried on by the tester by reference to compiled tables of discharging rates.

While I have shown and described the preferred embodiment of my invention, I wish it to be undertsood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An apparatus for testing batteries by the drop test method comprising a housing, a meter mounted therein adapted to show the condition of a battery when discharging at a predetermined rate, means to connect the meter in circuit with a battery, and an adjustable means within the housing connected in said circuit adapted to regulate the battery discharge rate.

2. An apparatus for testing batteries by the drop test method comprising a housing, a combination ammeter and voltmeter mounted in the housing adapted to show the condition of a battery when discharging at a predetermined rate, means to connect the meter in circuit with a battery, and an adjustable means within the housing connected in said circuit adapted to regulate the battery discharge rate.

3. An apparatus for testing batteries by the drop test method comprising a housing, a meter mounted therein adapted to show the condition of the battery when discharging at a predetermined rate, means rotatably mounted in the housing to connect the meter in circuit with a battery, and an adjustable means within the housing connected in said circuit adapted to regulate the battery discharge rate.

4. An apparatus for testing batteries by the drop test method comprising a housing, a meter mounted therein adapted to show the condition of a battery when discharging at a predetermined rate, means rotatably mounted in the housing to connect the meter in circuit with a battery, comprising a shaft having contact members attached thereto, and an adjustable means mounted upon the shaft within the housing connected in said circuit adapted to regulate the battery discharge rate.

5. An apparatus for testing batteries by the drop test method comprising a housing, a combination ammeter and voltmeter mounted therein adapted to show the condition of a battery when discharging at a predetermined rate, means within the housing to connect the meter in circuit with the battery comprising a rotatably mounted shaft having contact prongs attached thereto, and an adjustable means mounted on the shaft within the housing connected in said circuit adapted to regulate the battery discharge rate.

6. An apparatus for testing batteries by the drop test method comprising a housing, a combination ammeter and voltmeter mounted therein adapted to show the condition of the battery when discharging at a predetermined rate, means rotatably mounted in the housing to connect the meter in circuit with the battery, comprising a shaft having a disk member attached thereto, contact members mounted upon the disk, and an adjustable means carried by the shaft connected in the meter circuit adapted to regulate the battery discharge rate.

7. An apparatus for testing batteries by the drop test method, comprising a housing, a meter mounted therein adapted to show the condition of the battery when discharging at a predetermined rate, means rotatably mounted within the housing to connect the meter in circuit with a battery comprising a shaft having a disk member attached thereto, contact prongs mounted upon the disk and suitably connected in circuit with the meter, means to rotate the disk, and means supported by the shaft connected in the meter circuit adapted to regulate the battery discharge rate.

8. An apparatus for testing batteries by the drop test method comprising a ventilated housing, a meter mounted therein adapted to show the condition of the battery when discharging at a predetermined rate, means rotatably mounted in the housing to connect the meter in circuit with a battery comprising a shaft having a disk member attached thereto, two contact prongs mounted upon the disk and suitably connected in circuit with the meter, means to rotate the disk, and means coacting with the shaft and connected with the meter circuit adapted to regulate the battery discharge rate.

9. An apparatus for testing batteries by the drop test method comprising a housing, a meter mounted therein adapted to show the condition of the battery when discharging at a predetermined rate, means within the housing to connect the meter in circuit with the battery, and a variable resistance means within the housing connected in said circuit adapted to regulate the battery discharge rate.

10. An apparatus for testing batteries by the drop test method comprising a combination ammeter and voltmeter mounted in a housing and adapted to show the condition of a battery when discharging at a predetermined rate, means rotatably mounted in the housing to connect the meter in circuit with a battery, and an adjustable carbon pile formed by a series of carbon disks mounted upon the rotatable means within the housing, the carbon pile connected in parallel with the meter circuit to regulate the battery discharge rate.

11. An apparatus for testing batteries by the drop test method comprising a housing, a meter mounted therein adapted to show the condition of a battery when discharging at a predetermined rate, a shaft rotatably mounted in the housing, means carried by the shaft to connect the meter in circuit with the battery, and a variable resistance means mounted upon the shaft adapted to regulate the battery discharge rate.

12. An apparatus for testing batteries by the drop test method comprising a housing, a combination ammeter and voltmeter mounted therein, the housing adapted to show the condition of a battery when discharging at a predetermined rate, a shaft rotatably mounted in the housing, means carried by the shaft to connect the meter in circuit with a battery, a variable resistance comprising a series of carbon disks mounted upon the shaft and connected in parallel with the meter circuit adapted to regulate the battery discharge rate.

13. An apparatus for testing batteries by the drop test method comprising a housing, a combination ammeter and voltmeter mounted in the housing adapted to show the condition of a battery when discharging at a predetermined rate, means rotatably mounted in the housing to connect the meter in circuit with the battery, comprising a rotatable shaft having a disk member attached thereto, contact members mounted upon the disk, means to rotate the disk, and a variable resistance formed of a series of carbon disks mounted upon the rotatable shaft and adapted to regulate the battery discharge rate.

14. An apparatus for testing batteries by the drop test method comprising a housing, a meter mounted therein having calibrations for batteries of varying numbers of plates, and calibrations indicating the condition of the battery when discharging at predetermined rates, means to connect the meter in circuit with a battery comprising a rotatably mounted shaft having contact prongs attached thereto, and an adjustable means mounted upon the shaft within the housing and connected in said circuit to regulate the discharge rate.

15. An apparatus for testing batteries by the drop test method comprising a housing, a combination ammeter and voltmeter mounted therein, the meter being provided with a scale calibrated to indicate to an observer the condition of a battery through the voltage drop for a given rate of discharge, means rotatably mounted in the housing to connect the meter in circuit with a battery, comprising a shaft having a disk member attached thereto, means to rotate the disk, means to maintain the disk in electrical connection with the housing, and a variable resistance formed of a series of carbon disks mounted upon the rotatable shaft adapted to regulate the battery discharge rate.

16. An apparatus for testing batteries comprising a housing, a combination voltmeter and ammeter mounted therein, a shaft within the housing, a resistance element coacting with the shaft, contact points on the shaft adapted for engagement with battery terminals and means to rotate the shaft to vary the resistance and rotate the contact points.

17. A battery tester comprising a shunt, a variable resistance connected in series therewith, a pair of connectors for connecting a battery to be tested, in series with said shunt and resistance, a meter for measuring the drop across said shunt, and means on said tester for disconnecting said meter and connecting the same through a multiple resistance in parallel with said variable resistance and shunt.

In testimony whereof I affix my signature.
BENJAMIN F. W. HEYER.